(12) United States Patent
Ban et al.

(10) Patent No.: US 7,996,114 B2
(45) Date of Patent: Aug. 9, 2011

(54) WORKPIECE PICKING DEVICE AND METHOD

(75) Inventors: Kazunori Ban, Yamanashi (JP); Keisuke Watanabe, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1110 days.

(21) Appl. No.: 11/802,823

(22) Filed: May 25, 2007

(65) Prior Publication Data
US 2007/0274812 A1 Nov. 29, 2007

(30) Foreign Application Priority Data

May 29, 2006 (JP) ................................. 2006-148721

(51) Int. Cl.
G06K 9/00 (2006.01)
G05B 15/00 (2006.01)
B66C 1/42 (2006.01)

(52) U.S. Cl. ........ 700/259; 700/245; 382/153; 414/729; 901/47

(58) Field of Classification Search .................. 700/245, 700/259, 255, 253; 382/153, 152; 414/729, 414/730, 796.9, 796.5, 797.4, 785.4, 788.8, 414/922; 901/46, 47, 50; 318/568.13, 568.16, 318/568.21
See application file for complete search history.

(56) References Cited

U.S. PATENT DOCUMENTS

| | | | |
|---|---|---|---|
| 4,876,728 A * | 10/1989 | Roth | 382/153 |
| 5,987,591 A * | 11/1999 | Jyumonji | 700/259 |
| 6,328,523 B1 | 12/2001 | Watanabe et al. | |
| 6,665,588 B2 | 12/2003 | Watanabe et al. | |
| 6,845,296 B2 * | 1/2005 | Ban et al. | 700/245 |
| 7,123,992 B2 | 10/2006 | Ban et al. | |
| 7,844,104 B2 * | 11/2010 | Tropf | 382/153 |
| 2004/0081352 A1 | 4/2004 | Ban et al. | |
| 2004/0117066 A1 | 6/2004 | Ban et al. | |
| 2006/0104788 A1 | 5/2006 | Ban et al. | |

FOREIGN PATENT DOCUMENTS

| | | |
|---|---|---|
| EP | 0 951 968 | 10/1999 |
| EP | 1 411 322 | 4/2004 |
| JP | 07-319525 | 12/1995 |
| JP | 2000-263481 | 9/2000 |
| JP | 2000-304509 | 11/2000 |
| JP | 2003-34430 | 2/2003 |
| JP | 2004-160567 | 6/2004 |
| JP | 2005-305613 | 11/2005 |

OTHER PUBLICATIONS

Japanese Notice Reasons for Rejection mailed Dec. 4, 2007 issued in Japanese Application No. 2006-148721 (including a partial translation thereof).

* cited by examiner

Primary Examiner — Thomas G Black
Assistant Examiner — Christine Behncke
(74) Attorney, Agent, or Firm — Drinker Biddle & Reath LLP

(57) ABSTRACT

A workpiece picking device and method for reducing the cycle time of a picking operation of workpieces, by omitting or reducing the movement of a robot manipulator when an image of the workpieces is captured. An image processor of the picking device includes a camera controlling part for reading image data from a camera, a memory for storing the image data, a workpiece detecting part for extracting one or more images from the memory and detecting one or more workpieces in the image, and a workpiece selecting part for selecting a workpiece to be picked among the workpieces detected by the workpiece detecting part. The image processor further includes a stacked condition judging part for determining whether the condition of the stacked workpieces in a container is changed.

9 Claims, 2 Drawing Sheets

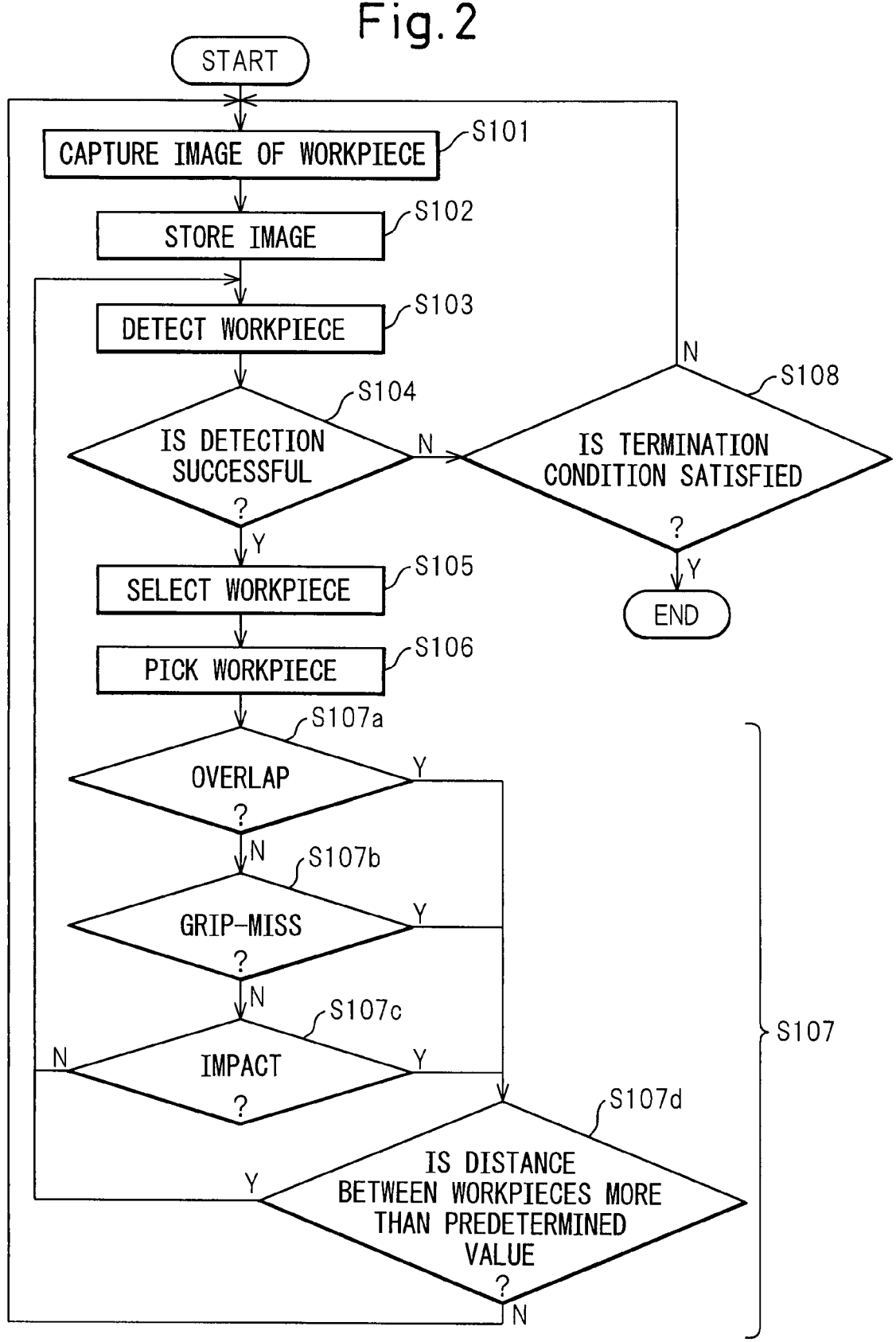

WORKPIECE PICKING DEVICE AND METHOD

RELATED APPLICATIONS

The present application claims priority from Japanese Patent Application No. 2006-148721, filed on May 29, 2006, the entire contents of which are fully incorporated herein by reference.

BACKGROUND OF THE INVENTION

1. Field of the Invention

The present invention relates to a picking device for a workpiece by using a robot manipulator, in particular a picking device and a picking method for reducing the time required for identifying an object by means of a vision sensor.

2. Description of the Related Art

In an application for picking an object or a workpiece from "a random pile", in which a plurality of workpieces are not positioned orderly on a pallet or the like, but are stacked disorderly in a box or the like, a camera is used for capturing an image of the workpieces in a wide range, in order to roughly find the position of the workpiece to be picked. For example, U.S. Pat. No. 5,987,591 discloses a sensor robot system combining a CCD camera for widely imaging workpieces and a laser sensor for measuring the three-dimensional positions of the workpieces. It is undesirable if the workpieces cannot be detected or captured in the image by the camera due to obstacles positioned in the field of view of the camera. Therefore, a picking device such as a robot manipulator must be moved outside the camera's field of view when capturing an image of the workpieces. However, this may increase the cycle time of the whole system that includes such picking devices.

When the workpieces are somewhat positioned orderly, once an image of the workpieces is obtained, the workpieces may be detected without capturing a new image of the workpieces every time a workpiece is picked up. Such a technique is known. However, when the workpieces are piled disorderly as in the above "random pile", frequently the position and/or the orientation of one workpiece is changed by picking another workpiece. Accordingly, while picking the workpiece from a "random pile", only when the picking device such as a robot manipulator moves the picked workpiece to a certain place outside of the camera's field of view, the image of another workpiece is captured. For example, Japanese Unexamined Patent Publication No. 7-319525, discloses a picking device capable of detecting a workpiece in a two-dimensional image captured by a camera, which matches a verifying model among prerecorded verifying models, in order to speed-up the picking operation from a random pile.

In the above technique, a newly captured image is required after a workpiece is detected and picked. Therefore, when a workpiece is successfully picked, the next image may be captured without delay, during the transportation of the workpiece. However, if the picking operation fails, in order to detect a next workpiece, it is necessary to move the picking device out of the field of view of the camera so as to capture a wide-range image, and/or to move the robot manipulator such that the area to be detected is within the field of view of the camera, and as a result, the system cycle time may increase.

SUMMARY OF THE INVENTION

Accordingly, the object of the present invention is to provide a workpiece picking device having a short cycle time, by omitting or reducing the motion of a robot manipulator when capturing an image of the workpiece.

According to one aspect of the present invention, a workpiece picking device is provided, comprising: an image capturing means for capturing an image of a plurality of piled workpieces; a memory for storing the image captured by the image capturing means; a workpiece detecting part for detecting one or more workpieces in the image stored in the memory; a workpiece selecting part for selecting a workpiece to be picked among one or more workpieces detected by the workpiece detecting part; a robot manipulator for picking the workpiece selected by the workpiece selecting part; and a stacked condition judging part for judging whether the condition of the plurality of stacked workpieces is changed by the picking operation of the robot manipulator, wherein the image capturing means does not capture an image of the stacked workpieces in the next picking operation when the stacked condition judging part determines that the piled condition of the workpieces is unchanged, at least around a workpiece to be picked in the next operation, in which case the workpiece detecting part detects a workpiece from the image captured by the image capturing means in the previous operation.

The workpiece picking device may further comprise an overlap detecting means for detecting whether a part of a workpiece to be picked is covered by another workpiece. In this case, the stacked condition judging part may judge that the condition of the workpieces is changed by the picking operation of the workpiece to be picked when the overlap detecting means detects that a part of the workpiece to be picked is covered by another workpiece.

Also, the workpiece picking device may further comprise a grip-miss detecting means for detecting whether the robot manipulator has suitably gripped a workpiece to be picked. In this case, the stacked condition judging part may judge that the condition of the stacked workpieces has changed when the grip-miss detecting means detects that the workpiece to be picked has not been suitably gripped.

Also, the workpiece picking device may further comprise an impact detecting means for detecting the impact applied to the robot manipulator during the picking operation. In this case, the stacked condition judging part may judge that the condition of the workpieces has changed when one or more workpieces other than the workpiece to be picked is affected by the impact detected by the impact detecting means.

On the other hand, the workpiece selecting part may select a first workpiece to be picked in the present picking operation and a second workpiece to be picked in the next operation. In this case, the stacked condition judging part may judge that the condition is not changed by the present picking operation, regardless of the detection result of the overlap detecting means, the grip-miss detecting means or the impact detecting means, when the distance between the first and second workpieces is greater than or equal to a predetermined distance.

In addition, the image capturing means may capture an image of the piled workpieces regardless of the judging result of the piled condition judging part, when the picking operation is performed for a predetermined number of times in a row without capturing a new image of the workpieces.

According to another aspect of the present invention, a method for picking a workpiece is provided, comprising the steps of: capturing an image of a plurality of stacked workpieces; storing the image of the stacked workpieces; detecting one or more workpieces in the stored image; selecting one workpiece to be picked among the one or more detected workpieces; picking the selected workpiece by using a robot manipulator; judging whether the condition of the plurality of stacked workpieces is changed by the picking operation of the robot manipulator; and detecting a workpiece from the stored image in the previous operation, without capturing a new image of the piled workpieces in the next picking operation, when the piled condition of the workpieces is judged to be unchanged at least around the workpiece to be picked in the next operation.

BRIEF DESCRIPTION OF THE DRAWINGS

The above and other objects, features and advantages of the present invention will be made more apparent by the following description, of the preferred embodiments thereof, with reference to the accompanying drawings wherein:

FIG. 2 is a flowchart showing a preferred example of the procedure of an operation for picking a workpiece.

DETAILED DESCRIPTIONS

Figure 1:
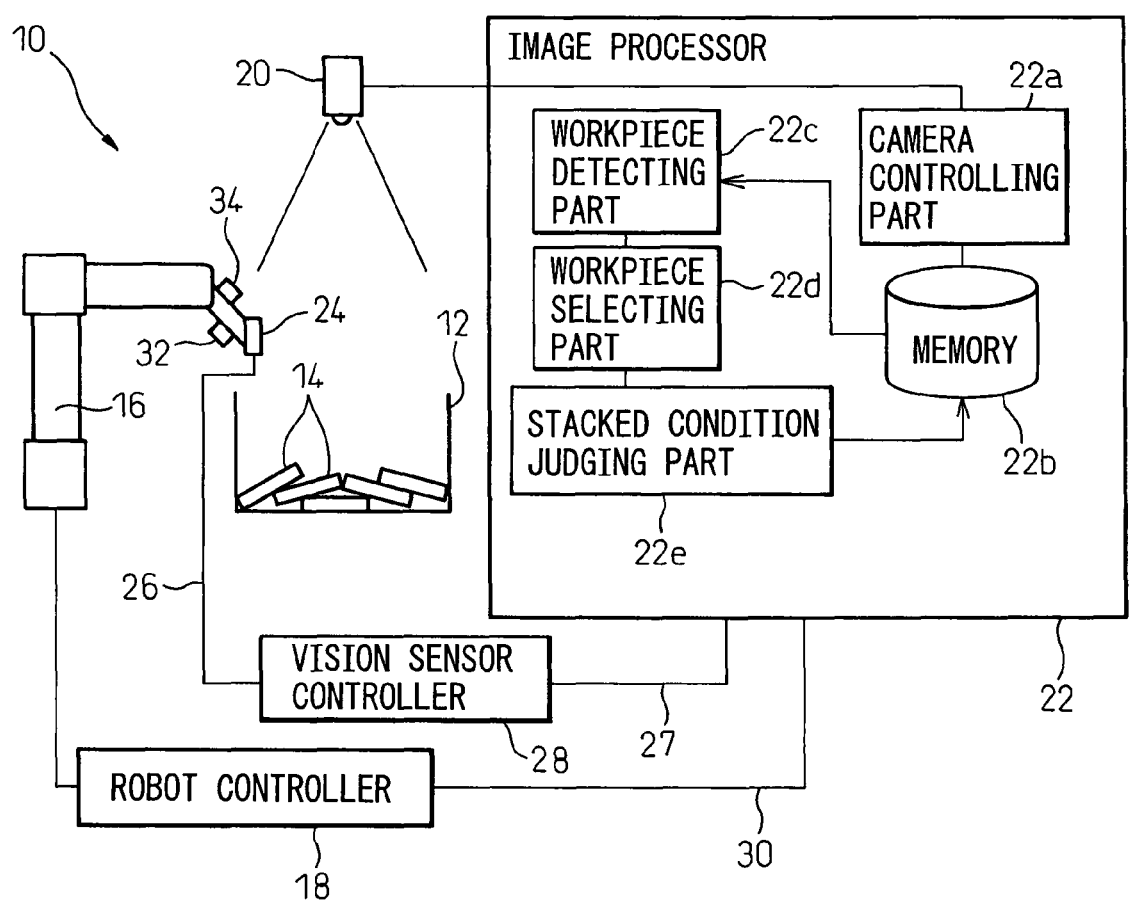
FIG. 1 shows a schematic configuration of a workpiece picking device according to the invention.

The present invention will be described below with reference to the drawings. FIG. 1 shows a total configuration of a workpiece picking device 10 according to a preferred embodiment of the invention. The picking device 10 has a robot manipulator (hereinafter, referred to as "manipulator") 16 capable of picking an object or the same kind of workpieces 14 contained in a work container 12, a robot controller 18 for controlling the manipulator 16, an image capturing means or a video camera (hereinafter, referred to as "camera") 20 positioned above the work container 12 so as to capture a wide-range image the workpieces 14 (for example, all of the work container 12 is within the range of the video camera 20), and an image processor 22 for processing an image obtained by the camera 20.

Each workpiece 14 is measured by a vision sensor 24 arranged on a wrist element of the manipulator 16. For example, the vision sensor 24, is a laser-projection type three-dimensional vision sensor, controlled by a vision sensor controller 28 connected to the sensor via a communication line 26. By connecting the vision sensor controller 28 to the image processor 22 via a communication line 27, the three-dimensional position and orientation of the specified workpiece 14 may be calculated in detail.

The robot controller 18 is connected to the image processor 22 via a communication line 30. Therefore, a result obtained by capturing and processing the image using the camera 20 and the image processor 22 may be utilized to control the manipulator 16 so as to handle (or a series of operations including approaching, gripping and picking) the workpiece 14. The robot controller 18 may be a known-type having a CPU, data memory, frame memory, an image processing processor and an interface. Therefore, a detailed explanation of the robot controller 18 is omitted.

Next, the function of the image processor 22 will be explained. Similarly to the robot controller 18, the image processor 22 also has a CPU, data memory, frame memory, an image processing processor and an interface. An explanation of such elements, having no direct relationship to the invention, is omitted.

As shown in FIG. 1, the image processor 22 includes a camera controlling part 22a for reading image data from the camera 20, a memory or an image storing part 22b for storing the image data, a workpiece detecting part 22c for extracting one or more images from the memory 22b and detecting one or more workpieces in the image, and a workpiece selecting part 22d for selecting a workpiece, to be picked by the manipulator 16, among the workpieces detected by the workpiece detecting part 22c. It is preferable that information relating to the features of a workpiece extracted from the image of a reference workpiece, is previously stored in the workpiece detecting part 22c. The image processor 22 is characterized in that the image processor further has a stacked condition judging part 22e for judging whether the condition of the stacked workpieces 14 in the container 12 is changed, and the workpiece selecting part 22d selects the workpiece to be picked based on the judgment of the judging part 22e.

FIG. 2 is a flowchart showing the operation of the picking device shown in FIG. 1. First, in step S101, the video camera 20 captures a wide-range image of the workpieces 14, and the captured image is stored in memory 22b in step S102. In the next step S103, the workpiece detecting part 22c extracts one or more images from the memory 22b and detects the (normally a plurality of) workpieces contained in the image. In the next step S104, it is determined whether at least one workpiece is detected in step S103. If a workpiece is detected, then the procedure progresses to step S105; otherwise, the procedure progresses to step S108.

In step S105, the workpiece selecting part 22c selects an optimum (normally one) workpiece, to be picked by the manipulator 16, from the workpieces detected in step S103. Normally, one workpiece positioned at the highest position (or having the largest detected size) among the detected workpieces is selected. At this point, it is preferable that the workpiece selecting part also selects an optimum secondary workpiece (i.e., a most probable workpiece which is to be selected as a workpiece to be picked in the next picking operation), as described below.

In step S105, the robot controller 18 controls the manipulator 16 to pick the selected workpiece. At this point, the picking operation by the manipulator includes calculating the movement position of the vision sensor 24, measuring the three-dimensional position and orientation of the selected workpiece by means of the vision sensor 24, and gripping the selected workpiece by means of the manipulator 16.

In the next step S107, the stacked condition judging part 22e determines whether the condition of the stacked workpieces 14 in the container 12 changing during the picking operation by the manipulator 16. In particular, in step S107a, it is determined whether another workpiece overlaps or covers a part of the selected workpiece to be picked, by means of the vision sensor 24. If overlapping is detected, then the position and/or the orientation of the workpiece covering the workpiece to be picked will most likely change by the picking operation. Therefore, the stacked condition can be considered to have changed.

Then, in step S107b, it is determined whether the hand of the manipulator 16 has suitably gripped the selected workpiece (in other words, whether a so-called "grip-miss" occurs or not). A check sensor for a handchuck, or a suction check sensor for a hand provided with a sucker may be used. Otherwise, a proximity sensor 32, for checking whether the hand is positioned at a suitable place relative to the workpiece, may be used. The "grip-miss" may be detected by such a grip-miss detecting means. When a grip-miss does not occur, the position and the orientation of the workpiece other than the picked workpiece are less likely to have changed during the picking operation, whereby the stacked condition of the workpieces in the container is determined to be unchanged.

Further, in step S107c, external force applied to the manipulator 16 during the picking operation may be detected by means of a disturbance detecting means provided to the robot controller 18. For example, the disturbance detecting means is a means for detecting a rapid change of a load applied to a motor for driving a joint axis of the manipulator 16, based on a rapid change of current passing through the motor. Since this means is a known technique, a detailed explanation thereof is omitted. Otherwise, external force applied to the manipulator 16 may also be detected by means of an impact detecting means, such as an acceleration sensor or an impact sensor 34 provided to the manipulator 16. When external force (or impact) is detected, it is determined whether the external force is due to interference between the manipulator (or the workpiece gripped by the manipulator) and the other workpieces in the container, or between the manipulator (or the workpiece gripped by the manipulator) and external equipment, in view of the orientation of the manipulator and/or the position of a TCP (tool center point) of the hand. In step S107c, when the workpieces in the container are involved in the impact, it is determined that the stacked condition of the workpieces has probably been changed by the impact.

Taking into consideration the reliability of the procedure, if it is determined that the stacked condition has changed in at least one of steps S107a to S107c, the procedure returns to step S101 so as to capture a new image of the workpieces by the camera 20. However, when the distance between one workpiece selected as the object to be picked in the present operation and another workpiece, which has been picked in the last operation, is greater than or equal to a predetermined distance, the position and the orientation of the former workpiece are not changed, even if the workpiece overlaps, or there is a grip-miss or impact that occurred in the last picking operation. Therefore, if a secondary optimum workpiece is selected in step S105, it is not necessary to capture a new image of the workpieces by the camera 20, regardless of the result in steps S107a to S107c. In step S107d, the image captured by the camera 20 is divided into a plurality of virtual segments. When one workpiece picked in the present operation and another workpiece to be picked in the next operation are not contained in the same segment or adjoining segments, the latter workpiece and the piled condition around the latter workpiece are not affected by the present picking operation. In addition, step S107d may be executed prior to step S107a. In this case, steps S107a to S107c are executed when the distance between the workpieces picked in the present operation and the workpiece to be picked in the next operation is less than a predetermined value in step S107d.

In step S107d, when it is determined that the stacked condition of the workpieces is unchanged, at least around a workpiece to be picked in the next operation (in particular, the stacked condition is unchanged in any steps S107a to S107c, or the condition is determined to be unchanged around the workpiece to be picked in the next operation), the procedure then returns to step S103 so as to detect the next workpiece using the past (for example, the last) image stored in the memory 22b. At this point, the workpiece picked in the last operation is obviously exempt from detection. In this case, since it is not necessary to capture a new image of the workpieces by means of the camera 20, the manipulator 16 does not need to be moved out of the field of view of the camera 20, or moved such that the field of view of the camera covers the area of the workpieces in the case where the camera is attached to the manipulator, whereby cycle time may be reduced. On the other hand, when the piled condition is determined to have changed, the procedure returns to step S101 so as to capture a new image by means of the camera 20.

In addition, although all of the steps S107a to S107d are executed in the flowchart shown in FIG. 2, one or more steps may be suitably selected corresponding to the size and/or the shape of the workpiece, or the required level of the judgment of the stacked condition.

As described above, the number of times of image capturing by the camera 20 is minimized as much as possible, in view of the reduction of cycle time. However, as the picking operation is repeated without capturing a new image of the workpieces by means of the camera, the divergence between the image of the camera and the actual condition becomes greater, whereby the judgment of the stacked condition may be inappropriate. Accordingly, when the number of times of the picking operation without capturing a new image by means of the camera reaches a predetermined number (for example, five), and the procedure returns to step S101, regardless of the judgment result of the stacked condition, so as to capture a new image by the camera and update the image in the memory.

On the other hand, when a workpiece is not capable of being picked is detected in step S104, the procedure progresses to step S108 so as to check whether a predetermined termination condition (for example, whether the number of picked workpieces reaches a certain number) is satisfied. If the termination condition is not satisfied, which means that no workpiece to be picked is contained in the last image, the procedure returns to step S101 so as to capture a new image by the camera 20. When the termination condition is satisfied, the picking operation is terminated.

If one workpiece selected as the object to be picked in step S105, is determined to be incapable of being picked for some reason, such as by the measurement results of the vision sensor 24, the piled condition of the workpieces is obviously unchanged. Therefore, the procedure may be the same as when the piled condition is judged to be unchanged in step S107.

According to the picking device and method of the present invention, when one or more workpieces are picked, it is determined whether the stacked condition of remaining workpieces is changed or not. When the condition is determined to be unchanged, it is not necessary to capture a new image of the workpieces by the camera in the next picking operation. Therefore, it is not necessary to move or hold the manipulator out of the field of view of the camera, whereby cycle time of the picking operation may be reduced.

As a concrete factor in determining the stacked condition, the presence or absence of overlap of a workpiece to be picked by another workpiece, the grip-miss of the manipulator, and/or interference between the manipulator and the workpiece, may be advantageously used. At this point, if the distance between a workpiece picked in the last operation and another workpiece to be picked in the next operation is greater than or equal to a predetermined distance, the stacked condition is determined to be unchanged regardless of the above factors.

Furthermore, when the picking operation is repeated without capturing a new image of the workpieces by means of the camera over a predetermined number of picking operations, the stacked condition may be judged more precisely by capturing a new image of the workpieces, regardless of the results of the stacked condition judging part.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A workpiece picking device, comprising:
a camera adapted to capture an image of a plurality of the same kind of disorderly piled workpieces so that the workpieces are within a field view of the camera;
a memory adapted to store the image captured by the camera;
a workpiece detecting part adapted to detect one or more workpieces in the image stored in the memory;
a workpiece selecting part adapted to select a workpiece to be picked among one or more workpieces detected by the workpiece detecting part;
a robot manipulator adapted to pick the workpiece selected by the workpiece selecting part; and
a stacked condition judging part adapted to judge whether the stacked condition of the plurality of piled workpieces is changed by the picking operation of the robot manipulator,
wherein the camera does not capture an image of the piled workpieces in the next picking operation when the stacked condition judging part determines that the stacked condition of the workpieces is unchanged, at least around a workpiece to be picked in the next operation, in which case the workpiece detecting part detects a workpiece from the image captured by the camera in the previous operation.

2. The workpiece picking device as set forth in claim 1, wherein the workpiece picking device further comprises an overlap detecting part adapted to detect whether a part of the workpiece to be picked is covered by another workpiece, and the stacked condition judging part judges that the condition of the workpieces is changed by the picking operation of the workpiece to be picked, when the overlap detecting part detects that a part of the workpiece to be picked is covered by another workpiece.

3. The workpiece picking device as set forth in claim 2, wherein the workpiece selecting part selects a first workpiece to be picked in the present picking operation and a second workpiece to be picked in the next operation, the stacked condition judging part judges that the condition is not changed by the present picking operation, regardless of the detection result of the overlap detecting part, when the distance between the first and second workpieces is greater than or equal to a predetermined distance.

4. The workpiece picking device as set forth in claim 1, wherein the workpiece picking device further comprises a grip-miss detecting part adapted to detect whether the robot manipulator has suitably gripped a workpiece to be picked, and the stacked condition judging part judges that the condition of the workpieces is changed when the grip-miss detecting part detects that the workpiece to be picked has not been suitably gripped.

5. The workpiece picking device as set forth in claim 4, wherein the workpiece selecting part selects a first workpiece to be picked in the present picking operation and a second workpiece to be picked in the next operation, the stacked condition judging part judges that the condition is not changed by the present picking operation, regardless of the detection result of the grip-miss detecting part, when the distance between the first and second workpieces is greater than or equal to a predetermined distance.

6. The workpiece picking device as set forth in claim 1, wherein the workpiece picking device further comprises an impact detecting part adapted to detect the impact applied to the robot manipulator during the picking operation, and the stacked condition judging part judges that the condition of the workpieces is changed when one or more workpiece other than the workpiece to be picked is affected by the impact detected by the impact detecting part.

7. The workpiece picking device as set forth in claim 6, wherein the workpiece selecting part selects a first workpiece to be picked in the present picking operation and a second workpiece to be picked in the next operation, the stacked condition judging part judges that the condition is not changed by the present picking operation, regardless of the detection result of the impact detecting part, when the distance between the first and second workpieces is greater than or equal to a predetermined distance.

8. The workpiece picking device as set forth in claim 1, wherein the camera captures an image of the workpieces, regardless of the judging result of the stacked condition judging part, when the picking operation is performed for a predetermined number of times in a row without capturing a new image of the workpieces.

9. A method for picking a workpiece, comprising the steps of:
capturing an image of a plurality of the same kind of disorderly piled workpieces by using a camera so that the workpieces are within a field view of the camera;
storing the image captured by the camera;
detecting one or more workpieces in the stored image;
selecting one workpiece to be picked among the one or more detected workpieces;
picking the selected workpiece by using a robot manipulator;
judging whether the stacked condition of the plurality of piled workpieces is changed by the picking operation of the robot manipulator; and
detecting a workpiece from the stored image in the previous operation, without capturing a new image of the piled workpieces in the next picking operation, when the stacked condition of the workpieces is judged to be unchanged, at least around the workpiece to be picked in the next operation.

* * * * *